United States Patent [19]

Sellers

[11] Patent Number: 5,519,569
[45] Date of Patent: May 21, 1996

[54] COMPACT NOTEBOOK COMPUTER HAVING A FOLDABLE AND COLLAPSIBLE KEYBOARD STRUCTURE

[75] Inventor: Charles A. Sellers, Houston, Tex.

[73] Assignee: Compaq Computer Corporation, Houston, Tex.

[21] Appl. No.: 268,853

[22] Filed: Jun. 30, 1994

[51] Int. Cl.⁶ .............................. G06F 1/16; B41J 11/56; H01H 13/02; H05K 7/04
[52] U.S. Cl. .................. 361/680; 400/490; 400/682; 200/344; 200/345
[58] Field of Search .................................. 400/479, 488, 400/490–492, 682; 200/5 A, 344, 345; 235/1 D, 145 R, 146; 364/708.1; 361/680; 341/22

[56] References Cited

U.S. PATENT DOCUMENTS

| 3,940,758 | 2/1976 | Margolin | 400/682 X |
|---|---|---|---|
| 5,141,343 | 8/1992 | Roylance et al. | 400/492 X |
| 5,187,644 | 2/1993 | Crisan | 400/682 X |
| 5,268,545 | 12/1993 | Bruner | 200/345 |
| 5,329,084 | 7/1994 | Watanabe et al. | 200/344 |
| 5,382,762 | 1/1995 | Mochizuki | 200/344 X |
| 5,424,516 | 6/1995 | Emmons | 200/344 |

OTHER PUBLICATIONS

Xerox Disclosure Journal, vol. 14, No. 3, pp. 139 and 140, "Folding Keyboard", Martin S. Maltz.
IBM Technical Disclosure Bulletin, vol. 32, No. 10B, Mar. 1990, pp. 266 and 267, "Folding Computer".

*Primary Examiner*—Michael W. Phillips
*Attorney, Agent, or Firm*—Konneker & Bush

[57] ABSTRACT

A compact notebook computer, when opened, exposes a keyboard structure in a folded storage and transport orientation in which opposite end segments of the keyboard are inwardly pivoted onto a central segment of the keyboard, and the keys are in fully retracted, inoperative positions. To use the keyboard its end segments are outwardly pivoted to a use orientation in which they project outwardly beyond opposite ends of the computer base housing and are vertically aligned with the central keyboard segment. A top side portion of the keyboard structure is then horizontally shifted in a first direction relative to a base portion thereof. Via an interaction between cammed portions of scissored linkage arm assemblies that movably support the keys, and resilient key return members adjacent thereto, this shifting automatically raises the keyboard keys to fully extended operative positions thereof, thereby readying the keyboard for typing thereon. To return the keyboard structure to its storage and transport orientation, the top keyboard side portion is horizontally shifted relative to the base portion in a second direction opposite to the first direction. Via an interaction between the scissored linkage arm assemblies, and drive projections formed on the keyboard structure base portion, this shifting automatically retracts the keys to their original inoperative positions. The opposite keyboard end segments are then folded inwardly onto the central segment to permit the computer lid housing to be closed again.

24 Claims, 5 Drawing Sheets

COMPACT NOTEBOOK COMPUTER HAVING A FOLDABLE AND COLLAPSIBLE KEYBOARD STRUCTURE

BACKGROUND OF THE INVENTION

1. Field of the Invention

The present invention relates generally to computer apparatus, and more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

A continuing challenge in the design of notebook computers, from a size reduction standpoint, is the keyboard structure. This design challenge arises from two conflicting design goals—the desire to even further reduce the size of the keyboard structure, and the desirability of having the note computer keyboard emulate as closely as possible the size and typing "feel" of a desktop computer keyboard.

Heretofore, compared to desktop computer keyboards, attempts to reduce the horizontal footprint size of notebook computer keyboards have entailed one or more of the following size reduction techniques—(1) a reduction in the total number of keys, (2) a reduction in the size of the individual key cap members, and/or (3) a reduction in the centerline-to-centerline distance between the individual key cap members. As is well known, each of these size reduction techniques has a practical limit which, if exceeded, substantially degrades the ability of a notebook computer user to use a "touch typing" technique—i.e., typing on the keyboard without the necessity of continuously looking at its keys.

Because in most, if not all, conventional notebook computer keyboards the limits of these three size reduction techniques have essentially been reached, the lengths and widths of such conventional keyboards tend to cluster around about 10 inches and 4 inches, respectively. This minimum horizontal length of conventional notebook computer keyboards (i.e., their horizontal lengths in a left-to-right direction as viewed by a user of the computer) serves to correspondingly establish the minimum left-to-right length of the housing portion of the notebook computer. Accordingly, most conventionally configured notebook computers have housing lengths that cluster about the 10 to 11 inch range.

In addition to these minimum horizontal or "footprint" size constraints commonly associated with notebook computer keyboards of conventional construction there have also been minimum vertical or "thickness" restraints associated with the design of notebook computer keyboards. For example, in an attempt to reduce the thickness of notebook computer keyboards one possibility which has been investigated is to simply reduce the keystroke distance of the keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

The results of these horizontal and vertical minimum dimensional limitations commonly adhered to in conventionally constructed notebook computer keyboards are that (1) the horizontal length of the computer housing must be at least slightly larger than the maximum horizontal length of the keyboard structure, and (2) the dedicated keyboard volume within the horizontal computer housing footprint must be equal to the maximum horizontal footprint area of the keyboard times its maximum vertical thickness.

In view of the continuing design effort to even further reduce the size of notebook and other portable computers, it can readily be seen from the foregoing that it would be highly desirable to provide a notebook computer having an improved keyboard structure which, compared to conventional notebook computers, permits the computer housing size, and the dedicated keyboard space within the housing, to be substantially reduced without correspondingly degrading keyboard typing performance. It is accordingly an object of the present invention to provide a notebook computer having these dual size reductions.

SUMMARY OF THE INVENTION

In carrying out principles of the present invention, in accordance with a preferred embodiment thereof, a compact portable computer, representatively a notebook computer, is provided with a specially designed foldable and collapsible keyboard structure. The computer includes a base housing portion having a top side, and a lid housing portion secured to the base housing portion for pivotal movement relative thereto between a closed position in which the lid housing portion extends across and covers the top side, and an open position in which the lid housing portion uncovers and exposes the top side of the base housing portion.

In a preferred embodiment thereof, the keyboard structure is carried on the top side of the base housing and includes a key support structure having top and bottom sides, and a series of keys each carried on the top side of the key support structure for vertical movement relative thereto, through a vertical key stroke distance, between extended and retracted positions. A base structure, representatively a multilayer signal pad structure, is carried beneath the key support structure and has a top side facing the bottom side of the key support structure. A spaced series of resilient key return members are disposed on the top side of the base structure.

The keyboard structure has a central segment defined by interconnected first portions of the key support structure and the base structure. The central segment is disposed between and hingedly connected to first and second opposite end segments respectively defined by interconnected second and third portions of the key support structure and the base structure, the first and second opposite end segments being inwardly pivotable onto the top side of the central segment to a storage and transport orientation, and are outwardly pivotable from their storage and transport orientation to a use orientation in which the central and first and second opposite end segments are vertically aligned, with the end segments projecting outwardly beyond opposite ends of the base housing.

The key support structure and the base structure are horizontally shiftable relative to one another between a first position in which the key return members underlie and resiliently hold the keys in their extended use positions, and a second position in which the key return members permit the keys to be moved from their extended positions to their retracted positions without vertically compressing the resilient key return members. Cooperatively engageable means are preferably provided on the keys and the base structure for forcibly driving the keys from their extended positions to their retracted, inoperative positions in response to the shifting of the base and key support structures from their first position to their second position.

When the lid housing is opened it exposes the keyboard in its folded storage and transport orientation in which the keys are in their fully retracted, inoperative positions. The keyboard end segments are then outwardly pivoted to their use orientations, and the key support structure and base structure are relatively shifted from their second position to their first position to automatically extend the keys to their operative positions. When use of the computer is completed, the key support structure and base structure are relatively shifted from their first position to their second position to retract the keys. The keyboard end segments are then inwardly folded onto the top side of the central keyboard segment to their storage and transport orientation to permit the computer lid housing to be closed again over the folded keyboard.

The unique construction of the keyboard that permits it to be both folded and collapsed permits the keyboard, in its outwardly pivoted use orientation, to be substantially identical in size and key orientation to a conventional notebook computer keyboard while permitting the horizontal length of the computer housing to be substantially smaller than the horizontal length of the keyboard in its use orientation. Additionally, the folded and collapsed keyboard occupies less volume than a conventionally constructed notebook computer keyboard having the same horizontal use orientation footprint and keystroke distance.

DETAILED DESCRIPTION

Figures 1A, 1B, 2A:
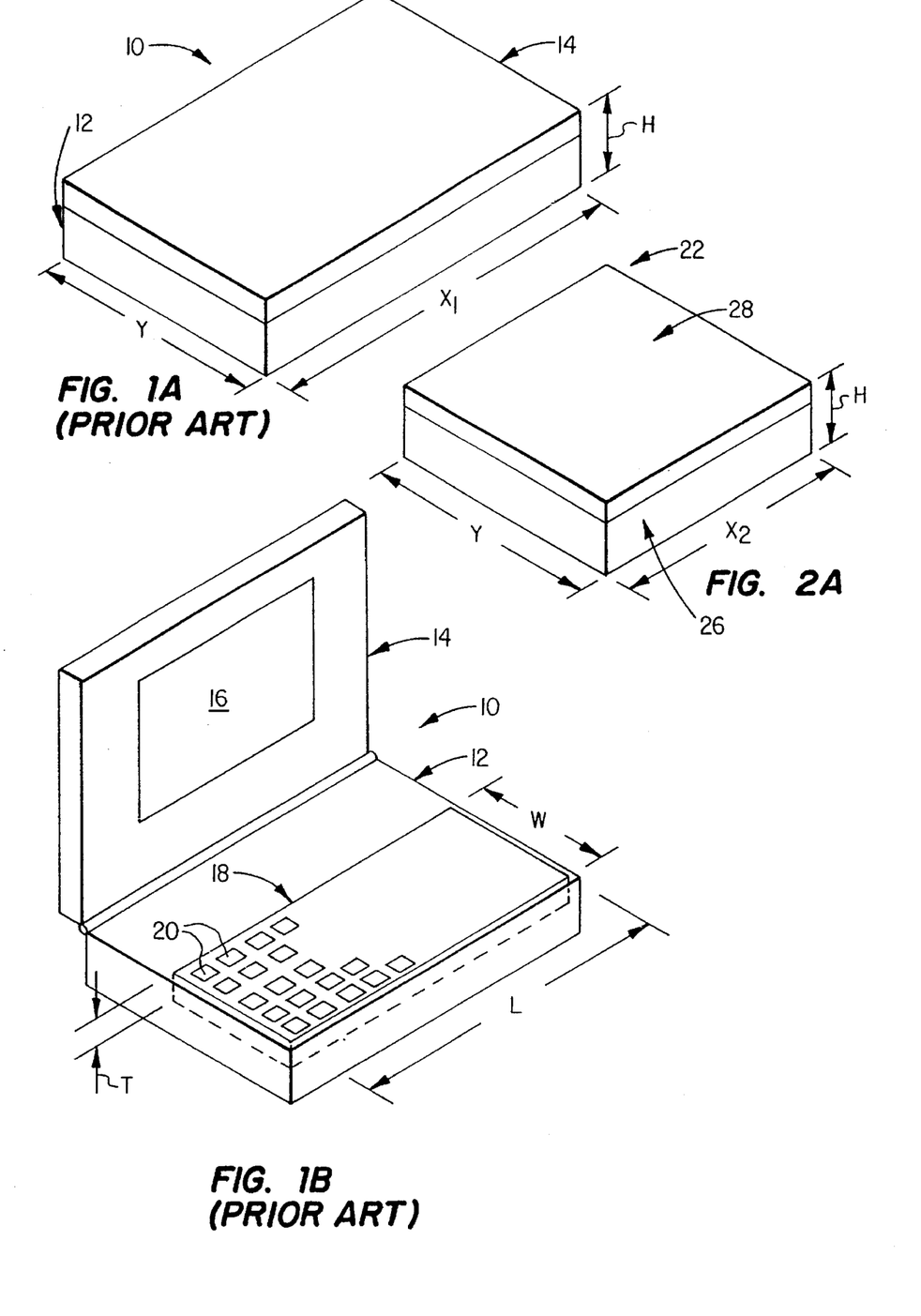
FIG. 1A (Prior Art) is a simplified perspective view of a conventionally configured notebook computer in its closed position.
FIG. 1B (Prior Art) is a simplified perspective view of the conventionally configured notebook computer in its opened position.
FIGS. 2A–2D are simplified perspective views of a compact notebook computer and, beginning with the compact computer in its closed position, sequentially illustrate the readying of a specially designed foldable, collapsible keyboard portion thereof for use.

Perspectively illustrated in FIGS. 1A and 1B (Prior Art) is a representative notebook computer 10 that includes the usual rectangular base and lid housings 12, 14 that are pivotally secured to one another for movement between a closed storage and transport orientation (FIG. 1A) and an open use orientation (FIG. 1B) in which a display screen 16 mounted on the inner side of the lid housing 14 is exposed to the user of the computer. With the computer 10 in its FIG. 1A closed orientation the computer 10 representatively has a left-to-right length $X_1$ of approximately 11 inches, a front-to-rear width Y of approximately 8.5 inches, and a height H of approximately 2 inches.

When the conventionally constructed notebook computer 10 is opened to its FIG. 1B use orientation, an elongated rectangular keyboard structure 18 is exposed along a top front side portion of the base housing 14. Representatively, the conventional keyboard structure 18 has a left-to-right horizontal length L of approximately 10.5 inches, a front-to-rear horizontal width W of approximately 4.25 inches, a vertical thickness of approximately 9 mm (0.35 inches), and a keystroke distance of 3 mm. Accordingly, the volume occupied by the conventional keyboard structure 18 is approximately 15.6 cubic inches.

For purposes of discussion it will be assumed that the centerline-to-centerline spacing of the keyboard keys 20 is the generally standard 0.75 inches. Without reducing this key spacing, or reducing the number of keys on the keyboard 18, the approximately 10.5 inch keyboard length L is generally a minimum for this keyboard dimension. As can be seen by comparing FIGS. 1A and 1B, the minimum housing length $X_1$ of the computer 10 is limited by the minimum keyboard length L.

Figure 2B:
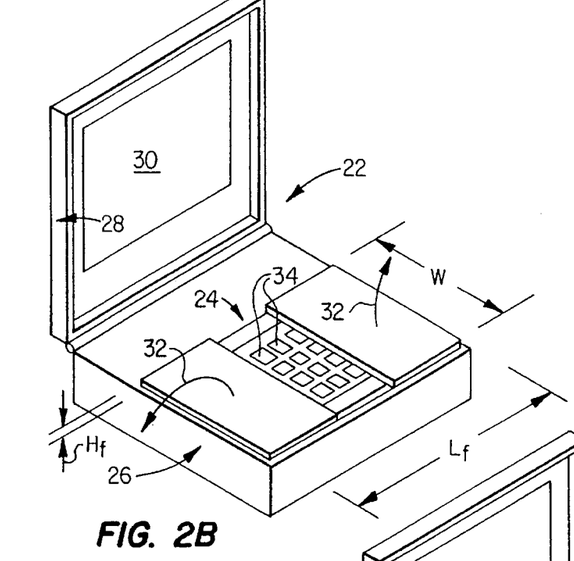
Figures 2C, 2D:
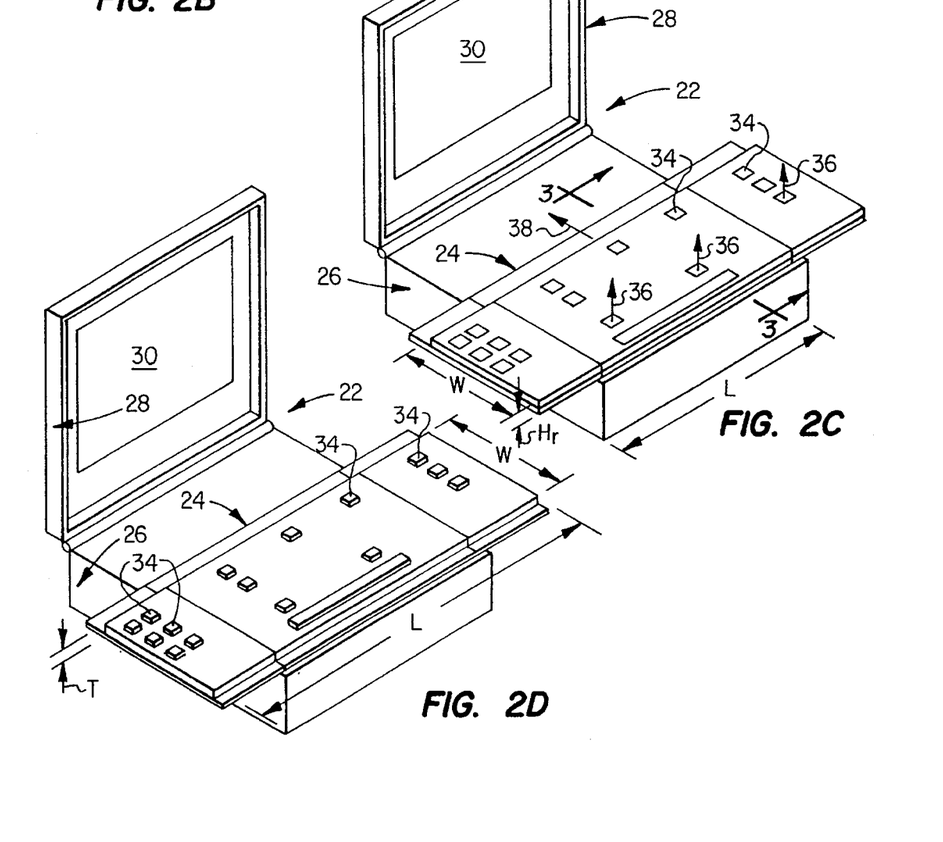

Referring now to FIGS. 2A–2D, this housing length limitation is uniquely avoided, however, in a specially designed compact notebook computer 22 that incorporates therein a folding, collapsible keyboard 24 embodying principles of the present invention. Like the previously described conventional notebook computer 10, the compact notebook computer 22 has rectangular base and lid housings 26, 28 that are pivotally interconnected for movement between a closed storage and transport orientation of the computer 22 (FIG. 2A) and an opened use orientation (FIGS. 2B–2D). Latch means (not shown) are provided for releasably retaining the lid housing 28 in its closed position. A display screen 30 is disposed on the inner side of the lid housing 28. Representatively, the display screen 30 is the same size as the display screen 16 (FIG. 1B) on the conventional notebook computer 10.

Basic Operation of the Keyboard Structure 24

As subsequently described herein in greater detail, opening the lid housing 28 of the compact computer 22 (see FIG. 2B) exposes the keyboard structure 24 which is initially in a folded storage and transport orientation and extends across a front top side portion of the base housing 26. To use the keyboard structure 24 it is then unfolded in left and right directions, as indicated by the arrows 32 in FIG. 2B, to its elongated rectangular use configuration in which opposite ends of the keyboard structure 24 overhang the left and right ends of the base housing 26 as illustrated in FIG. 2C.

In the FIG. 2B folded storage and transport orientation of the keyboard structure 24, and in its FIG. 2C initially unfolded orientation, the individual key cap portions 34 of the keyboard are retracted, through their full key stroke distances, to inoperative positions. To upwardly extend the key cap members 34 (as indicated by the arrows 36 in FIG. 2C) to their operative, ready-to-use positions shown in FIG.

2D, an upper side portion of the keyboard 24 is manually shifted in a rearward direction, as indicated by the arrow 38 in FIG. 2C, relative to the balance of the keyboard structure 24. As later described herein, cooperating means on the relatively shiftable upper and lower side portions of the keyboard structure automatically extend the keys 34 to their use positions in response to this shifting of the upper keyboard side portion from its FIG. 2C position to its FIG. 2D position.

When the use of the computer 22 is completed, the computer is returned to its FIG. 2A storage and transport orientation by first shifting the upper side portion of the keyboard structure 24 from its FIG. 2D position to its FIG. 2C position to retract the keys 34. The keyboard structure 24 is then folded from its FIG. 2C position to its FIG. 2B storage and transport orientation, and the lid housing 28 is then closed as shown in FIG. 2A.

For purposes of comparison, it will be assumed that the individual key cap members 34 of the keyboard structure 24 have the same 3 mm keystroke distance, and the same 0.75 inch centerline spacing, as the conventional keyboard structure 18 shown in FIG. 1B. Additionally, in its FIG. 2D use orientation the keyboard structure 24 will be assumed to have the same length L, width W and height H dimensions as the conventional keyboard structure 18 shown in FIG. 1B. Accordingly, the overall volume of the keyboard structure 24 in its FIG. 2D use orientation is essentially the same—about 15.6 cubic inches—as the conventional notebook computer keyboard 18.

However, with the keys 34 retracted as shown in FIG. 2C the vertical thickness $H_r$ of the keyboard 24 is reduced to approximately 6 mm. Accordingly, when the keyboard 24 is folded to its FIG. 2B storage and transport orientation the vertical thickness $H_f$ of the folded keyboard is approximately 12 mm. The folded length $L_f$ of the keyboard structure 24 is representatively about 6.125 inches, and the width W of the folded keyboard is 4.25 inches—the same width as that of the conventional keyboard 18. Thus, the total volume of the folded keyboard structure 24 is approximately 12.23 cubic inches.

This represents a reduction of approximately 21.6 percent in the volume that must be allocated for the folded keyboard 24 within the housing envelope of the compact notebook computer 22 compared to the keyboard volume required within the housing of the conventionally configured notebook computer 10. Not only is the required in-housing keyboard space reduced in the compact computer 22, but the overall housing space required to accommodate the keyboard structure 24 is substantially reduced as well as may be readily seen by comparing FIGS. 1A and 2A.

Specifically, the dimensions Y and H in the closed computer 22 are the same as their counterpart dimensions in the closed computer 10, but the horizontal length $X_2$ of the computer 22 may be reduced to approximately 7 inches as compared to the approximately 11 inch length dimension $X_1$ of the computer 10 in FIG. 1A. This advantageously permits the overall volume of the closed computer 22 to be reduced by approximately 36 percent compared to the volume of the closed computer 10. However, and quite importantly, these two space saving characteristics are achieved without reducing the size of the keyboard structure 24 (in its FIG. 2D use orientation) compared to the size of the conventional keyboard structure 18.

Structure of the Foldable, Collapsible Keyboard 24

Figure 3:
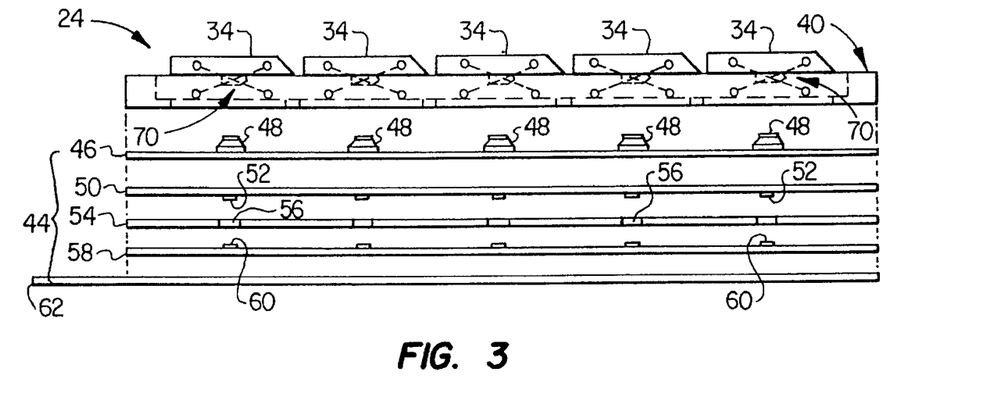
FIG. 3 is a highly schematic exploded cross-sectional view through the keyboard portion taken along line 3—3 of FIG. 2C.
Figure 6A:
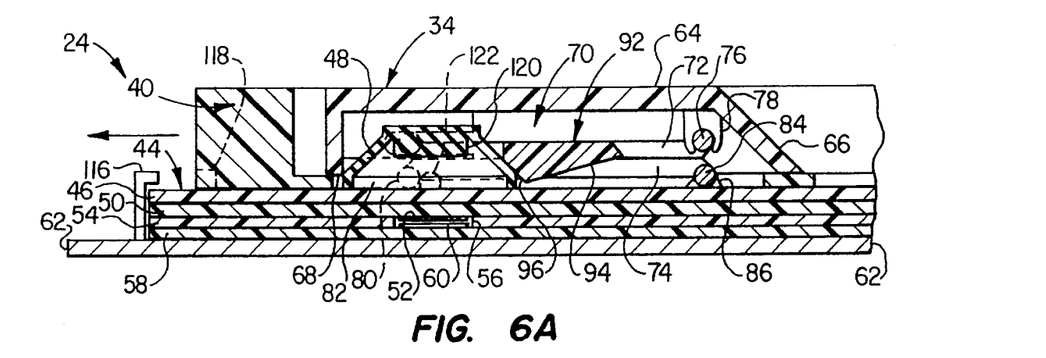
FIGS. 6A and 6B are enlarged scale partial cross-sectional views through the foldable, collapsible keyboard portion respectively taken along line 6A—6A of FIG. 5B, and line 6B—6B of FIG. 5C.
Figure 6B:
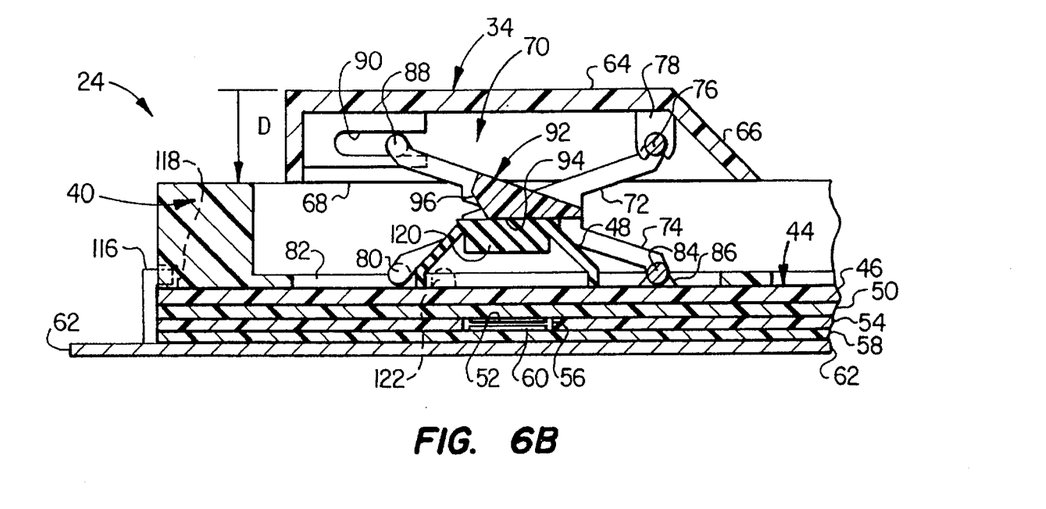

Referring now to FIGS. 3, 6A and 6B, the keyboard structure 24 basically comprises a relatively thin rectangular monoblok key support structure 40 upon the top side of which the manually depressible keys 34 are carried for vertical movement relative to the support structure 40, through a keystroke distance D, and a rectangularly configured multilayer signal pad base structure 44 that underlies the key support structure 40 in a parallel relationship therewith.

The signal pad structure 44, which is of a generally conventional construction, is shown in simplified exploded form in FIG. 4 and includes, from top to bottom, (1) a plastic dome sheet 46 having a spaced series of rubber key return domes 48 projecting upwardly from its top side; (2) a plastic top circuit sheet 50 having a spaced series of circular, electrically conductive pads 52 disposed on its bottom side, aligned with the domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62. The five sheet members 46, 50, 54, 58, 62 are suitably held in their indicated stacked orientation to combinatively define the overall signal pad structure 44.

Turning now to FIGS. 4A, 4B, 6A and 6B, each of the key cap members 34 has a hollow, rectangular molded plastic body with a top side wall 64 with a downwardly and forwardly sloping front edge portion 66, and an open bottom side 68. A scissored linkage assembly 70 is secured to the bottom of each of the key cap members 34 and includes a first pair of scissor arms 72 and a second pair of scissor arms 74, with longitudinally intermediate portions of the arms 72 being pivotally connected to longitudinally intermediate portions of the arms 74 as indicated.

Figure 4A:
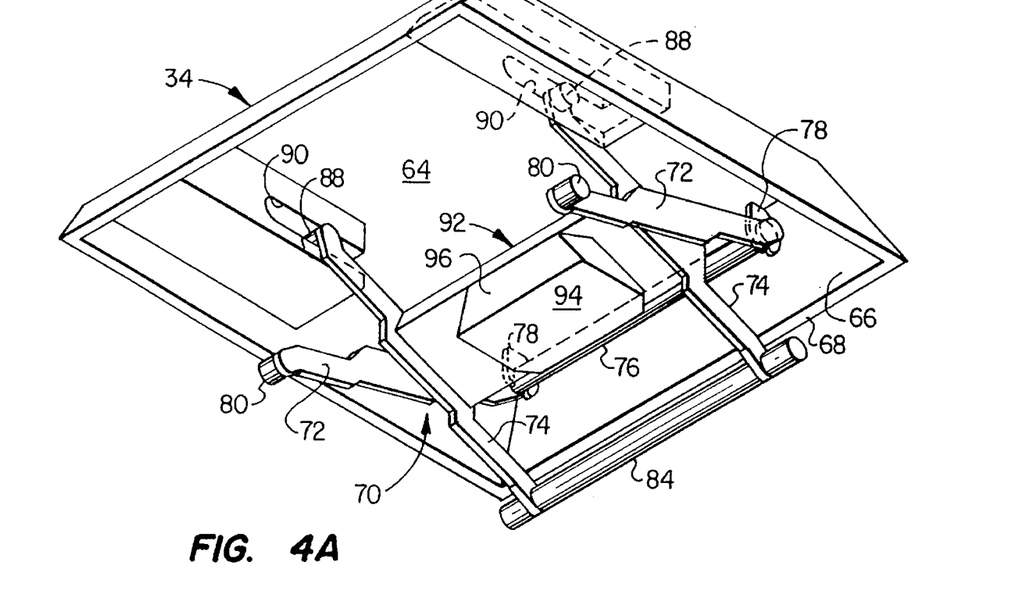
FIGS. 4A and 4B are enlarged scale bottom side perspective views of the keyboard portion key cap members respectively illustrating a scissored support portion thereof in its extended and retracted positions.
Figure 4B:
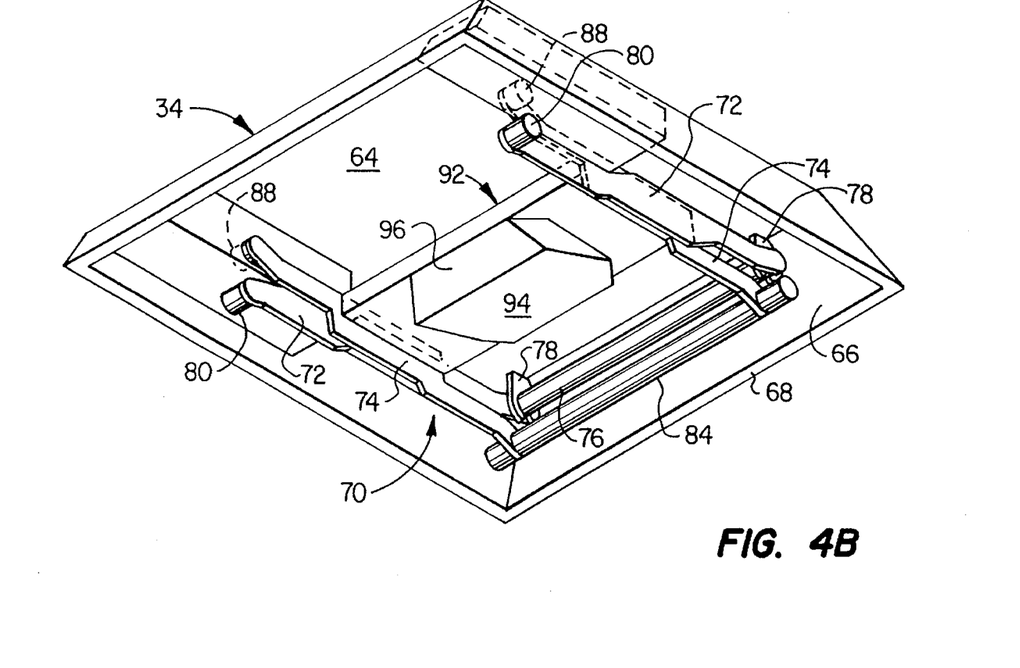

First ends of the arms 72 are joined by a cylindrical rod 76 pivotally anchored in tabs 78 projecting downwardly from the top key member wall 64, while the opposite ends of the arms 72 have outwardly projecting cylindrical pins 80 formed thereon and slidingly received in a slot 82 formed in the bottom side of the support structure 40. First ends of the arms 74 are joined by a cylindrical rod 84 having its opposite ends pivotally anchored in tabs 86 on the bottom side of the support structure 40, while the opposite ends of the arms 74 have outwardly projecting cylindrical pins 88 slidingly received in slots 90 formed on the underside of the key cap member 34.

Longitudinally intermediate portions of the scissor arms 74 are interconnected by a joining plate structure 92 having, on its underside, a bottom bearing surface 94, and a rearwardly facing cam surface 96 extending at an angle to the bearing surface 94. Each scissored linkage assembly 70 is movable relative to its associated key cap member 34 between an extended position shown in FIGS. 4A and 6B, and a retracted position shown in FIGS. 4B and 6A.

Figure 5A:
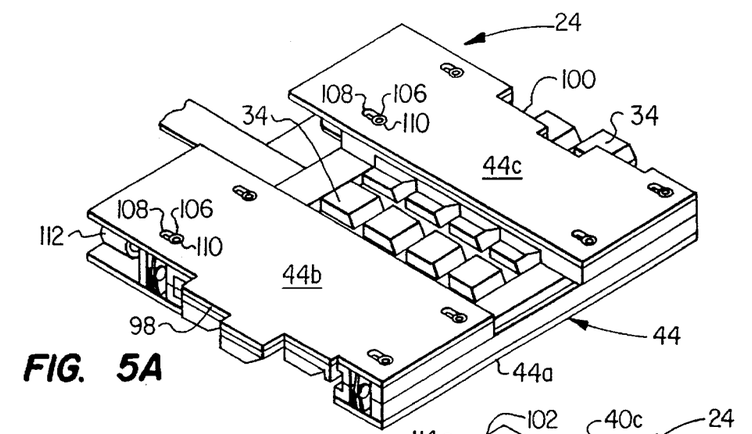
FIGS. 5A–5C are enlarged scale perspective views of the foldable, collapsible keyboard portion respectively illustrating it in its folded storage and transport orientation, its initially unfolded orientation, and its operatively shifted use orientation.
Figures 5B, 5C:
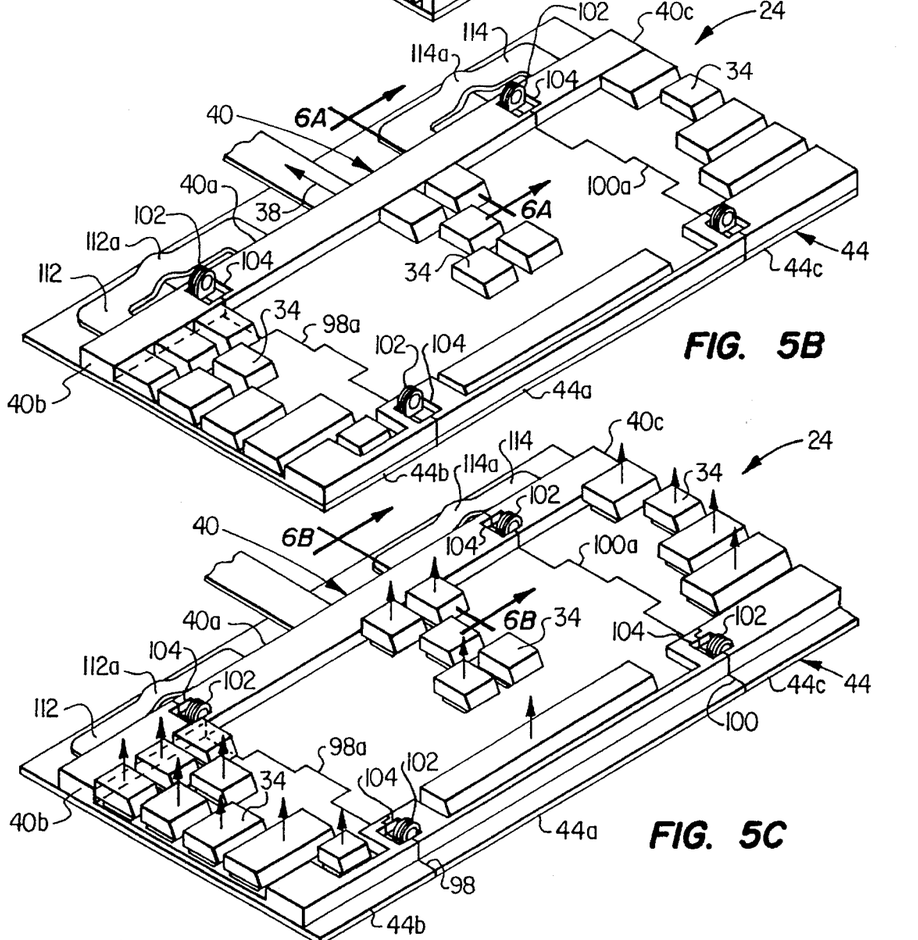

Turning now to FIGS. 5A–5C, the foldable and collapsible keyboard structure 24 is perspectively illustrated in its folded storage and transport orientation in FIG. 5A, in its initially unfolded orientation in FIG. 5B, and in its shifted use orientation in FIG. 5C. The folding and unfolding capabilities of the keyboard structure 24 are achieved by constructing it in a segmented configuration.

Specifically, the signal pad structure 44 is formed from separate central, left end and right end segments 44a, 44b, 44c that are pivotally interconnected to one another, along zig-zagged joint lines 98 and 100, by hinge structures 102 projecting upwardly from the top side of the signal pad structure 44. The central signal pad structure segment 44a is anchored to the base housing 26 (see FIGS. 2A–2D) and extends across its top side between points spaced inwardly apart from its opposite left and right ends.

The key support structure 40 is similarly split to permit the folding and unfolding of the keyboard structure 24 and is formed from separate central and left and right end segments 40a, 40b, 40c that have zig-zagged joint lines 98a, 100a which are essentially identical in configuration to the signal pad structure joint lines 98 and 100, respectively. The joint lines 98a, 100a are zig-zagged so that they extend between adjacent pairs of the keys 34 instead of extending through any of the keys. Hinge structures 102 project upwardly through suitable openings 104 formed in the support structure segments at their joint lines 98a, 100a (see FIGS. 5B and 5C).

The support structure segments 40a, 40b, 40c are respectively secured to the top sides of the signal pad structure segments 44a, 44b and 44c, for forward and rearward sliding movement therealong, by a plurality of mounting pins 106 (see FIG. 5A) extending from the signal pad structure segments downwardly through slots 108 formed in the signal pad structure segments. The support structure segments 40a, 40b, 40c are captively retained on their associated signal pad structure segments 44a, 44b, 44c by means of enlarged head portions 110 of the mounting pins that underlie the bottom side of the signal pad structure segments.

The interaction between the pins 106 and the opposite ends of the slots 108 permit the key support structure 40 to be horizontally shifted relative to the signal pad structure 44 between a forward limit position shown in FIG. 5B, and a rear limit position shown in FIG. 5C. The interlocking of the unfolded support structure segments 40a, 40b, 40c along their joint lines 98a, 100a links these segments for conjoint sliding movement along the top side of the unfolded signal pad structure 44.

As best illustrated in FIGS. 5B and 5C, the separate left and right end segments 44b, 44c of the signal pad structure 44, respectively, are electrically coupled to its central segment 44a by a pair of generally U-shaped flexible ribbon type conductor cables 112, 114 that overlie the top side of a rear side edge portion of the signal pad structure 44. Cables 112, 114 have, at central portions thereof, upwardly projecting service loop portions 112a, 114a. When the keyboard structure 24 is folded to its FIG. 5A storage and transport orientation the ribbon cables 112, 114 are bent between the opposite end segments of the keyboard structure and its central segment.

When the keyboard structure 24 is in its FIG. 5A storage and transport orientation, the outer end segments of the support structure and signal pad are folded inwardly onto the top side of the central support structure segment 40a, the folded support structure 40 is in its forward limit position relative to the signal pad structure 44, and the keys 34 are fully retracted as cross-sectionally illustrated in FIG. 6A. With the key cap members 34 fully retracted in this manner, the key return domes 48 are rearwardly offset from the central scissor linkage assembly joining plate structures 92 of their associated key cap members 34, and the linkage assemblies 70 are in their retracted positions.

The key cap members 34 remain in their retracted positions as the keyboard structure 24 is unfolded from its FIG. 5A position to its FIG. 5B position. With the keyboard structure 24 unfolded, its opposite ends project outwardly beyond the left and right ends of the base housing 26 as illustrated in FIG. 2C.

To ready the now unfolded keyboard structure 24 for typing, the computer user manually pushes the support structure 40 rearwardly from its FIG. 5B forward limit position to its FIG. 5C rear limit position. This rearward shifting of the support structure 40 relative to the signal pad structure 44 causes the linkage assembly cam surfaces 96 to forcibly engage the sloping front side surfaces of the key return domes 48, thereby forcing the domes under the joining plate structures 92 (see FIG. 6B) and bringing the keys 34 to their upwardly extended operative positions in which the linkage assemblies are upwardly extended and the upper ends of the domes 48 underlie and engage the bearing surfaces 94 of the joining plate structures 92.

As the support structure 40 reaches its FIG. 6B rear limit position, the forwardly bent upper ends of retaining hook members 116 on the upper side of the signal pad structure 44 enter corresponding recesses 118 on the rear side edge of the pad structure end segments 44b, 44c to thereby releasably lock the keyboard structure 24 in its unfolded orientation. A subsequent forward shifting of the support structure to its forward limit position withdraws the hooks 116 from the recesses to permit the keyboard structure 24 to be folded again for storage.

With the keyboard structure 24 in its FIG. 6B use orientation, when any of the key cap members 34 is manually depressed, against the resilient resistance of its associated return dome 48, the dome is downwardly deformed to cause an internal projection 120 therein to be downwardly pressed against a portion of the dome sheet 46 underlying the projection 108. This, in turn, causes the contact pad pair 52, 60 underlying the projection 108 to be brought into engagement with one another and cause their associated circuitry to output an electrical signal indicative of the striking of their associated key cap member. When the key cap member is released from its manually depressed orientation, it is automatically returned upwardly to its FIG. 6B position by the resilient force of its underlying key return dome 48 which functions as a return spring means.

When it is desired to return the compact notebook computer 22 to its FIG. 2A closed storage and transport orientation, the support structure 40 is manually shifted forwardly back to its FIG. 5B front limit position also cross-sectionally illustrated in FIG. 6A. This forward shifting of the support structure 40, by means of a spaced series of drive projections 122 formed on the top side of the signal pad sheet 46, forcibly returns the key cap members 34 from their FIG. 6B upwardly extended operative positions to their FIG. 6A downwardly retracted storage and transport orientations.

Specifically, as illustrated in FIGS. 6A and 6B, the projections 122 are positioned forwardly adjacent the scissor linkage assembly pin portions 80. When the support structure 40 is forwardly shifted from its FIG. 6B position to its FIG. 6A position the projections 122 engage the pin portions 80, and act as stops therefor, in a manner forcibly collapsing the linkage assemblies and retracting the key cap members.

The keyboard structure 24 may then be folded to its storage and transport orientation shown in FIGS. 2B and 5A, and the computer lid housing 28 closed, to return the compact notebook computer 22 to its FIG. 2A storage and transport orientation.

While in the illustrated keyboard structure 24 the central segment 44a of the signal pad structure 44 is anchored to the base housing 26, and the support structure 40 is horizontally shiftable relative to the signal pad structure 44, it will be appreciated that, if desired, the central segment 40a of the support structure could alternatively be anchored to the base housing 26 and the signal pad structure 44 be supported for horizontal shifting relative to the support structure 40.

The foregoing detailed description is to be clearly understood as being given by way of illustration and example only, the spirit and scope of the present invention being limited solely by the appended claims.

What is claimed is:

1. A foldable, collapsible keyboard structure for a portable computer, comprising:

a key support structure having top and bottom sides;

a series of keys each carried on said top side of said key support structure for vertical movement relative thereto, through a vertical key stroke distance, between extended and retracted positions;

a base structure carried beneath said key support structure and having a top side facing said bottom side of said key support structure; and a spaced series of resilient key return members disposed on said top side of said base structure, said key support structure and said base structure being horizontally shiftable relative to one another between a first position in which said key return members underlie and resiliently hold said keys in said extended positions thereof, and a second position in which said key return members permit said keys to be moved from said extended positions thereof to said retracted positions thereof without vertically compressing said resilient key return members, said keyboard structure having a central segment defined by interconnected first portions of said key support structure and said base structure, said central segment being disposed between and hingedly connected to first and second opposite end segments respectively defined by interconnected second and third portions of said key support structure and said base structure, said first and second opposite end segments being inwardly pivotable onto the top side of said central segment to a storage and transport orientation, and outwardly pivotable from said storage and transport orientation to a use orientation in which said central and first and second opposite end segments are vertically aligned.

2. The foldable, collapsible keyboard structure of claim 1 further comprising:

cooperatively engageable means on said keys and said base structure for forcibly driving said keys from said extended positions thereof to said retracted positions thereof in response to shifting of said base and key support structures from said first position thereof to said second position thereof.

3. The foldable, collapsible keyboard structure of claim 2 wherein:

said keys are secured to said key support structure by scissored linkage arm assemblies, and said cooperatively engageable means include portions of said scissored linkage arm assemblies and a spaced series of projections formed on said top side of said base structure and operative to drivingly engage and move said portions of said scissored linkage arm assemblies, in response to a shifting of said base and key support structures from said first position thereof to said second position thereof, in a manner forcibly collapsing said scissored linkage arm assemblies.

4. The foldable, collapsible keyboard structure of claim 1 wherein:

said keys are secured to said key support structure by scissored linkage arm assemblies each having a central portion with mutually angled bearing and cam surfaces thereon, said resilient key return members are hollow elastomeric dome members having upper ends and sloping side portions, said upper ends of said dome members underlying and upwardly engaging said bearing surfaces when said base and key support structures are in said first position thereof, and said cam surfaces being positioned and configured to be slidingly engaged by said sloping dome member side portions in a manner driving said key members from said retracted positions thereof to said extended positions thereof in response to shifting of said base and key support structures from said second position thereof to said first position thereof.

5. The foldable, collapsible keyboard structure of claim 1 wherein:

said key support structure is a generally rectangular monoblok support structure.

6. The foldable, collapsible keyboard structure of claim 1 wherein:

said base structure is a multilayered signal pad structure with closable electrical contact structures underlying said resilient key return members.

7. The foldable, collapsible keyboard structure of claim 6 wherein:

said second and third portions of said multilayered signal pad structure are electrically coupled to said first portion of said multilayered signal pad structure by flexible ribbon cable connector members.

8. The foldable, collapsible keyboard structure of claim 7 wherein:

said flexible ribbon cable connector members are configured and positioned to be bent between said central segment and said first and second opposite end segments when said first and second opposite end segments are inwardly pivoted onto the top side of said central segment.

9. A foldable, collapsible keyboard structure for a portable computer, comprising:

a key support structure having top and bottom sides;

a series of keys disposed on said top side of said key support structure;

a series of scissored linkage arm assemblies interconnected between said keys and said key support structure and permitting said keys to be vertically moved relative to said key support structure, through a vertical key stroke distance, between extended and retracted positions, each of said scissored linkage arm assemblies having a central portion with mutually angled bearing and cam surfaces thereon; and a multilayered signal pad structure carried beneath said key support structure and having a top side facing said bottom side of said key support structure, said signal pad structure having a spaced series of closeable electrical contact structures thereon, and a spaced series of elastomeric key return dome members secured to said top side of said signal pad structure and overlying said contact structures, each of said key return dome members having an upper end and a sloping side surface, and a spaced series of drive projections formed on said top side of said signal pad structure, said key support structure and said signal pad structure being horizontally shiftable relative to one another between a first position in which said upper ends of said key return dome members underlie and upwardly engage said bearing surfaces and hold said key members in said extended positions thereof, with said scissored linkage arm assemblies in extended positions thereof, and a second position in which said upper ends of said key return dome members are horizontally offset from said bearing surfaces and said keys are in said retracted positions thereof with said scissored linkage arm assemblies in collapsed positions thereof, said cam surfaces and said sloping side surfaces of said key return dome members being relatively positioned and configured to be interengaged, in response to a shifting of said key support structure and said signal pad structure from said second position to said first position, in a manner driving said keys from said retracted positions thereof to said extended positions thereof, said drive projections being positioned and configured to engage portions of said scissored support arm assemblies and forcibly move said scissored support arm assemblies from said extended positions thereof to said collapsed positions thereof, thereby driving said keys from said extended positions thereof to said retracted positions thereof, in response to a shifting of said key support structure and said signal pad structure from said first position thereof to said second position thereof, said keyboard structure having a central segment defined by interconnected first portions of said key support structure and said signal pad structure, said central segment being disposed between and hingedly connected to first and second opposite end segments respectively defined by interconnected second and third portions of said key support structure and said signal pad structure, said first and second opposite end segments being inwardly pivotable onto the top side of said central segment to a storage and transport orientation, and outwardly pivotable from said storage and transport orientation to a use orientation in which said central and first and second opposite end segments are vertically aligned.

10. A portable computer comprising:

a base housing portion having a top side;

a lid housing portion secured to said base housing portion for pivotal movement relative thereto between a closed position in which said lid housing portion extends across and covers said top side, and an open position in which said lid housing portion uncovers and exposes said top side; and a foldable, collapsible keyboard structure including:
a key support structure extending across said top side of said base housing portion and having top and bottom sides,
a series of keys each carried on said top side of said key support structure for vertical movement relative thereto, through a key stroke distance, between an upwardly extended operative position and a downwardly retracted nonoperative position,
a base structure underlying said key support structure and having a top side facing said bottom side of said key support structure, one of said base structure and said key support structure being horizontally shiftable relative to the other of said base structure and said key support structure between a first position and a second position,
first cooperatively engageable means on said keys and said base structure for driving said keys from said upwardly extended operative positions to said downwardly retracted nonoperative positions in response to a shifting of said one of said base structure and said key support structure from said first position thereof to said second position thereof, and
second cooperatively engageable means on said keys and said base structure for driving said keys from said retracted nonoperative positions thereof to said extended operative positions thereof in response to a shifting of said one of said base structure and said key support structure from said second position thereof to said first position thereof, said keyboard structure having a central segment defined by interconnected first portions of said key support structure and said base structure, said central segment being disposed between and hingedly connected to first and second opposite end segments respectively defined by interconnected second and third portions of said key support structure and said base structure, said first and second opposite end segments being inwardly pivotable onto the top side of said central segment to a storage and transport orientation in which said keyboard structure is coverable by said lid housing in said closed position, and, with said lid housing opened, being outwardly pivotable from said storage and transport orientation to a use orientation in which said central and first and second opposite end segments are vertically aligned, with said first and second opposite end segments horizontally projecting outwardly beyond said base housing portion,
said keys being secured to said key support structure by scissored linkage arm assemblies each having a central portion with mutually angled bearing and cam surfaces thereon,
said base structure having a spaced series of resilient key return members and a spaced series of drive members projecting upwardly from said top side of said base structure,
said first cooperatively engageable means including said drive members and portions of said scissored linkage arm assemblies spaced apart from said central portions thereof, and
said second cooperatively engageable means including said cam surfaces and said resilient spring return members.

11. The portable computer of claim 10 wherein:

the base structure portion of said central segment of said keyboard structure is anchored to said base housing portion, and said key support structure is horizontally shiftable relative to said base structure.

12. The portable computer of claim 10 wherein:

said base structure is a multi-layer signal pad structure having closeable electrical contact structures underlying said resilient key return members.

13. The portable computer of claim 12 wherein:

said second and third portions of said multilayered signal pad structure are electrically coupled to said first portion of said multilayered signal pad structure by flexible ribbon cable connector members.

14. The portable computer of claim 13 wherein:

said flexible ribbon cable connector members are configured and positioned to be bent between said central segment and said first and second opposite end segments when said first and second opposite end segments are inwardly pivoted onto the top side of said central segment.

15. The portable computer of claim 12 wherein:

said resilient key return members are elastomeric key return dome members.

16. The portable computer of claim 10 wherein said portable computer is a notebook computer.

17. A foldable, collapsible computer keyboard structure comprising:

a key support structure;

a body portion underlying said key support structure;

a series of keys each carried on said key support structure for movement relative thereto, in a first direction through a key stroke distance, between extended and retracted positions;

resilient means associated with said body portion, said resilient means and said series of keys being shiftable relative to one another between a first position in which said resilient means engage said series of keys and resiliently bias them toward said extended positions thereof, and a second position in which said resilient means are disengaged from said series of keys and permit them to be moved to said retracted positions thereof without deforming said resilient means; and shifting means operable to selectively shift said resilient means and said series of keys between said first and second positions thereof, said computer keyboard structure having a central segment defined by interconnected first portions of said key support structure and said body portion, said central segment being disposed between and hingedly connected to first and second opposite end segments respectively defined by interconnected second and third portions of said key support structure and said body portion, said first and second opposite end segments being inwardly pivotable onto the top side of said central segment to a storage and transport orientation, and outwardly pivotable from said storage and transport orientation to a use orientation in which said central and first and second opposite end segments are vertically aligned.

18. The computer keyboard structure of claim 17 wherein:

said shifting means are further operative to forcibly move said series of keys to said retracted positions thereof in response to relative movement of said resilient means and said series of keys from said first positions to said second position.

19. The computer keyboard structure of claim 17 wherein:

said shifting means are operable to create a relative horizontal shift between said resilient means and said series of keys.

20. The computer keyboard structure of claim 17 wherein:

said resilient means have spaced apart deformable portions that are aligned with and underlie said series of keys when said resilient means and said series of keys are in said first position thereof.

21. The computer keyboard structure of claim 20 wherein:

said deformable portions of said resilient means are defined by a spaced series of elastomeric key return dome members.

22. The computer keyboard structure of claim 17 wherein:

said resilient means are operative to engage said series of keys, and drive them to said extended positions thereof, in response to a shift of said resilient means and said series of keys from said second position thereof to said first position thereof.

23. The portable computer according to claim 10, wherein said lid housing portion further comprises an outer side surface, an inner side surface, and a display mounted on said inner side surface.

24. The computer keyboard structure of claim 17, wherein said key support structure comprises a series of recesses formed thereon for receiving said series of keys therein when each of said series of keys is moved between said extended and retracted positions.

* * * * *